US 6,480,668 B1

(12) United States Patent
Muroya et al.

(10) Patent No.: US 6,480,668 B1
(45) Date of Patent: Nov. 12, 2002

(54) SIGNAL PROCESSING CIRCUIT (75) Inventors: Tsuyoshi Muroya, Yokohama (JP); Kohei Murayama, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/364,068

(22) Filed: Jul. 30, 1999

(30) Foreign Application Priority Data

Sep. 9, 1998 (JP) ............................................. 10-254914

(51) Int. Cl.$^7$ ................................................. H04N 5/91
(52) U.S. Cl. .......................................... 386/93; 123/131
(58) Field of Search ............................... 386/46, 85, 93, 386/116, 123, 131; 348/613; 375/240.01

(56) References Cited

U.S. PATENT DOCUMENTS 5,276,562 A * 1/1994 Sakamoto .................... 386/93
5,491,514 A * 2/1996 Fukuda et al. ......... 375/240.01
5,606,424 A    2/1997 Jung

FOREIGN PATENT DOCUMENTS

DE          4303469        8/1994

* cited by examiner

*Primary Examiner*—Huy Nguyen
(74) *Attorney, Agent, or Firm*—Louis Woo (57) ABSTRACT

A recording apparatus operates in any one of a standard mode and a high-quality mode. The apparatus records a video signal of a standard format during the standard mode of operation. The apparatus records a video signal of a high-quality format during the high-quality mode of operation. A signal processing circuit for use in the apparatus includes a first device for subjecting a first signal to a nonlinear emphasis process to convert the first signal into a second signal. A second device operates for selecting one of the first signal and the second signal in response to whether the apparatus operates in the standard mode or the high-quality mode, and for outputting the selected signal as a third signal. A third device operates for subjecting the third signal to a nonlinear de-emphasis process to convert the third signal into a fourth signal. A fourth device operates for selecting one of the third signal and the fourth signal in response to whether the apparatus operates in the standard mode or the high-quality mode, and for outputting the selected signal as a fifth signal. A fifth device operates for separating a sync signal from the fifth signal. During the standard mode of operation of the apparatus, the first device selects the first signal, and the fourth device selects the third signal. During the high-quality mode of operation of the apparatus, the first device selects the second signal, and the fourth device selects the fourth signal.

3 Claims, 4 Drawing Sheets

| MODE | SW1 | SW2 | SW3 | SW4 | SW5 | SW6,7 | SW8 |
|---|---|---|---|---|---|---|---|
| COMPOSITE VHS | POSITION ① | POSITION ① | POSITION ② | | POSITION ② | POSITION ① | |
| COMPONENT VHS | POSITION ① | POSITION ① | POSITION ② | POSITION ① | POSITION ① | POSITION ② | POSITION ② |
| COMPOSITE S-VHS | POSITION ① | POSITION ① | POSITION ① | | POSITION ② | POSITION ① | |
| COMPONENT S-VHS | POSITION ① | POSITION ① | POSITION ① | POSITION ① | POSITION ① | POSITION ② | POSITION ① |

SIGNAL PROCESSING CIRCUIT

BACKGROUND OF THE INVENTION

1. Field of the Invention

This invention relates to a signal processing circuit for separating a sync signal from a video signal. The signal processing circuit of this invention can be used in a magnetic recording apparatus. This invention also relates to a signal processing apparatus.

2. Description of the Related Art

Some video tape recorders (VTR's) are based on a standard format referred to as a VHS format. There is an S-VHS format which improves over the VHS format. A VTR of the S-VHS standard can record and reproduce a video signal which is wider in frequency band and higher in picture quality than a video signal handled by a VTR of the VHS standard.

To provide compatibility with the VHS VTR, the S-VHS VTR is designed to record and reproduce a video signal in any one of the S-VHS format and the VHS format. During the VHS recording mode of operation of the VTR, the video signal is processed according to the VHS format. On the other hand, during the S-VHS recording mode of operation of the VTR, the video signal is processed according to the S-VHS format. If the S-VHS processing of the video signal includes a step of sub emphasis, it tends to be difficult to correctly separate a sync signal from the sub-emphasis-resultant video signal.

SUMMARY OF THE INVENTION

It is an object of this invention to provide a signal processing circuit for correctly separating a sync signal from a video signal.

It is another object of this invention to provide an improved signal processing apparatus.

A first aspect of this invention provides a signal processing circuit for use in a recording apparatus which operates in any one of a standard mode and a high-quality mode, the apparatus recording a video signal of a standard format during the standard mode of operation, the apparatus recording a video signal of a high-quality format during the high-quality mode of operation, wherein the video signal of the high-quality format is wider in frequency band than the video signal of the standard format. The circuit comprises first means for subjecting a first signal to a nonlinear emphasis process to convert the first signal into a second signal; second means for selecting one of the first signal and the second signal in response to whether the apparatus operates in the standard mode or the high-quality mode, and for outputting the selected signal as a third signal; third means for subjecting the third signal to a nonlinear de-emphasis process to convert the third signal into a fourth signal, the nonlinear de-emphasis process being inverse with respect to the nonlinear emphasis process; fourth means for selecting one of the third signal and the fourth signal in response to whether the apparatus operates in the standard mode or the high-quality mode, and for outputting the selected signal as a fifth signal; and fifth means for separating a sync signal from the fifth signal; wherein during the standard mode of operation of the apparatus, the first means selects the first signal, and the fourth means selects the third signal; and wherein during the high-quality mode of operation of the apparatus, the first means selects the second signal, and the fourth means selects the fourth signal.

A second aspect of this invention provides a signal processing circuit comprising first means for subjecting a first video signal to a nonlinear emphasis process to convert the first video signal into a second video signal; second means for selecting one of the first video signal and the second video signal, and for outputting the selected video signal as a third video signal; third means for subjecting the third video signal to a nonlinear de-emphasis process to convert the third video signal into a fourth video signal, the nonlinear de-emphasis process being inverse with respect to the nonlinear emphasis process; fourth means for selecting the third video signal when the second means selects the first video signal, for selecting the fourth video signal when the second means selects the second video signal, and for outputting the selected signal as a fifth video signal; and fifth means for separating a sync signal from the fifth video signal.

A third aspect of this invention provides a video signal processing apparatus comprising a first video signal processing circuit; and a second video signal processing circuit connectable to the first video signal processing circuit; wherein the first video signal processing circuit and the second video signal processing circuit comprise means for processing either a video signal of a standard format or a video signal of a high-quality format into a record signal in the presence of the second video signal processing circuit connected to the first video signal processing circuit, and the video signal of the high-quality format is higher in picture quality than the video signal of the standard format and is wider in frequency band than the video signal of the standard format; wherein the first video signal processing circuit comprises means for processing a video signal of the standard format into a record signal in the absence of the second video signal processing circuit; wherein the second video signal processing circuit comprises means for subjecting the video signal of the high-quality format to a nonlinear emphasis process to convert the video signal of the high-quality format into a first processing-resultant signal; and wherein the first video signal processing circuit comprises means for subjecting the first processing-resultant signal to a nonlinear de-emphasis process to convert the first processing-resultant signal into a second processing-resultant signal, and means for separating a sync signal from the second processing-resultant signal, the nonlinear de-emphasis process being inverse with respect to the nonlinear emphasis process.

DESCRIPTION OF THE PREFERRED EMBODIMENT

A background-art signal processing circuit which is not prior art against this invention will be explained below for a better understanding of this invention.

Figure 1:
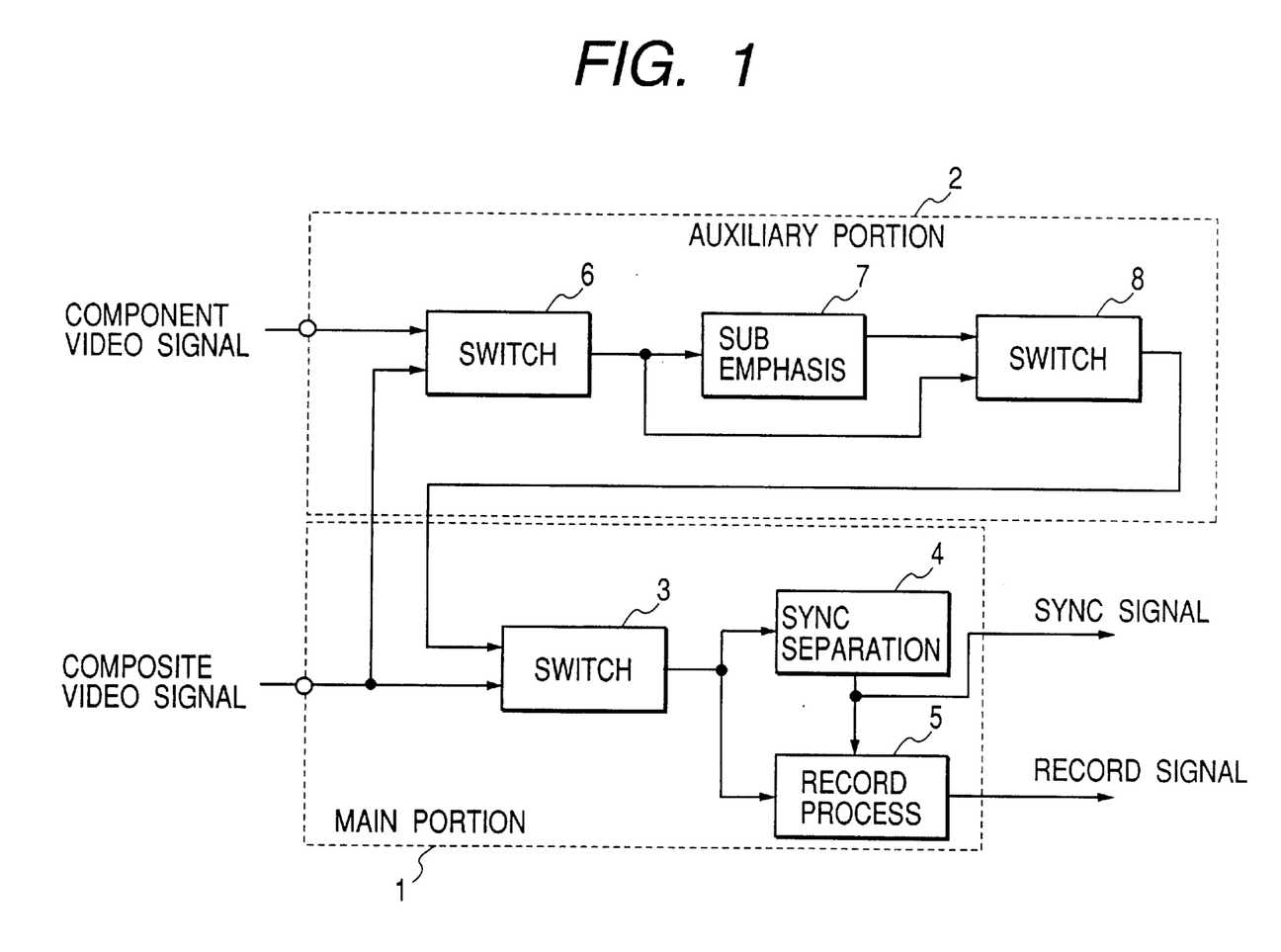
FIG. 1 is a block diagram of a background-art signal processing circuit which is not prior art against this invention.

With reference to FIG. 1, the background-art signal processing circuit has a main signal processing portion 1 and an auxiliary signal processing portion (an added signal processing portion or an optional signal processing portion) 2.

The main signal processing portion 1 implements video-signal processing for record according to the VHS format. When the auxiliary signal processing portion 2 is combined with the main signal processing portion 1, it is possible to implement video-signal processing for record according to any one of the VHS format and the S-VHS format.

The main signal processing portion 1 includes a switch 3, a sync separation circuit 4, and a record processing circuit 5. The auxiliary signal processing portion 2 includes a switch 6, a sub emphasis circuit 7, and a switch 8.

In the case where the main signal processing portion 1 is used singly, a composite video signal is transmitted via the switch 3 to the sync separation circuit 4 and the record processing circuit 5. The sync separation circuit 4 separates a sync signal from the composite video signal. The sync separation circuit 4 outputs the separated sync signal to the record processing circuit 5. The sync separation circuit 4 outputs the separated sync signal also to an external. The record processing circuit 5 separates the composite video signal into a luminance signal and chrominance signals. The record processing circuit 5 processes the luminance signal. The record processing circuit 5 processes the chrominance signals. The record processing circuit 5 combines the processing-resultant luminance signal and the processing-resultant chrominance signals into a frequency-division multiplexed signal. The record processing circuit 5 outputs the frequency-division multiplexed signal as a record signal (a signal to be recorded).

In the case where the auxiliary signal processing portion 2 is combined with the main signal processing portion 1, the switch 6 selects one of a composite video signal and a set of component video signals. When the switch 6 selects the composite video signal, the composite video signal is transmitted via the switch 6 to the sub emphasis circuit 7 and the switch 8. In this case, the sub emphasis circuit 7 subjects the composite video signal (specifically, luminance components of the composite video signal) to a sub emphasis process including a nonlinear emphasis process. The sub emphasis circuit 7 outputs the sub-emphasis-resultant composite video signal to the switch 8. When the switch 6 selects the set of the component video signals, the set of the component video signals is transmitted via the switch 6 to the sub emphasis circuit 7 and the switch 8. In this case, the sub emphasis circuit 7 subjects the component video signals (specifically, a luminance signal among the component video signals) to the sub emphasis process. The sub emphasis circuit 7 outputs the set of the sub-emphasis-resultant component video signals to the switch 8.

Operation of the combination of the main signal processing circuit 1 and the auxiliary signal processing circuit 2 can be changed between a VHS mode and an S-VHS mode. During the VHS mode of operation, the switch 8 selects the output signal of the switch 6 and transmits the selected signal to the switch 3. The output signal of the switch 8 is transmitted via the switch 3 to the sync separation circuit 4 and the record processing circuit 5. The sync separation circuit 4 separates a sync signal from the output signal of the switch 3. The sync separation circuit 4 outputs the separated sync signal to the record processing circuit 5. The sync separation circuit 4 outputs the separated sync signal also to the external. The record processing circuit 5 separates the output signal of the switch 3 into a luminance signal and chrominance signals. The record processing circuit 5 processes the luminance signal. The record processing circuit 5 processes the chrominance signals. The record processing circuit 5 combines the processing-resultant luminance signal and the processing-resultant chrominance signals into a frequency-division multiplexed signal. The record processing circuit 5 outputs the frequency-division multiplexed signal as a record signal (a signal to be recorded).

During the S-VHS mode of operation, the switch 8 selects the output signal of the sub emphasis circuit 7 and transmits the selected signal to the switch 3. The output signal of the switch 8 is transmitted via the switch 3 to the sync separation circuit 4 and the record processing circuit 5. The sync separation circuit 4 separates a sync signal from the output signal of the switch 3. The sync separation circuit 4 outputs the separated sync signal to the record processing circuit 5. The sync separation circuit 4 outputs the separated sync signal also to the external. The record processing circuit 5 separates the output signal of the switch 3 into a luminance signal and chrominance signals. The record processing circuit 5 processes the luminance signal. The record processing circuit 5 processes the chrominance signals. The record processing circuit 5 combines the processing-resultant luminance signal and the processing-resultant chrominance signals into a frequency-division multiplexed signal. The record processing circuit 5 outputs the frequency-division multiplexed signal as a record signal (a signal to be recorded).

In the sync separation circuit 4, the output signal of the switch 3 is compared with a slice level to derive every sync pulse therefrom. During the S-VHS mode of operation, the output signal of the sub emphasis circuit 7 is transmitted to the sync separation circuit 4 via the switches 3 and 8. Thus, during the S-VHS mode of operation, the signal inputted into the sync separation circuit 4 from the switch 3 results from the sub emphasis process.

Figure 2:
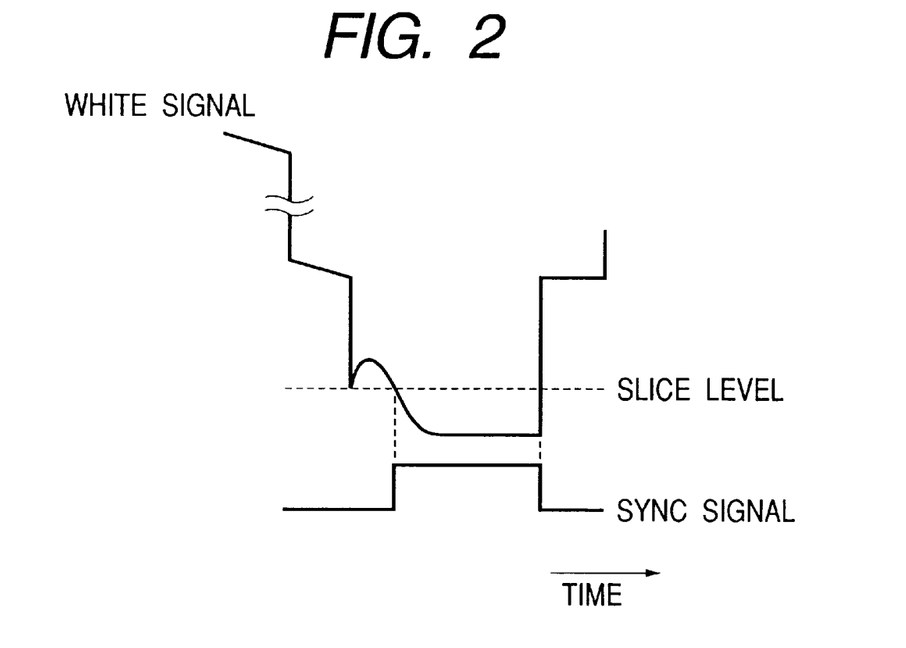
FIG. 2 is a time-domain diagram of a sync-pulse-added portion of a white signal, and a sync signal derived therefrom.
Figure 3:
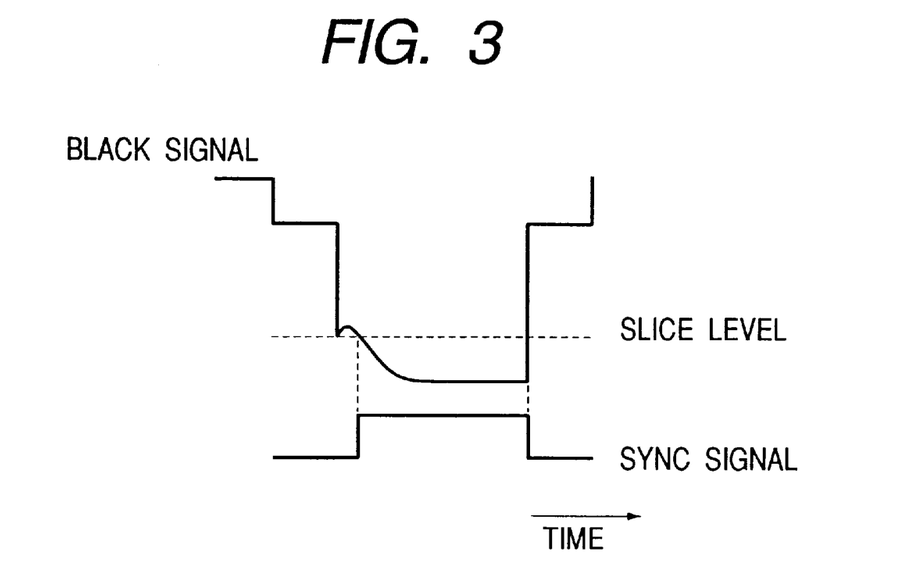
FIG. 3 is a time-domain diagram of a sync-pulse-added portion of a black signal, and a sync signal derived therefrom.

FIG. 2 shows the waveform of a sync-pulse-added portion of a white signal inputted into the sync separation circuit 4 from the switch 3. FIG. 3 shows the waveform of a sync-pulse-added portion of a black signal inputted into the sync separation circuit 4 from the switch 3. The waveform of the sync-pulse-added portion of the white signal and the waveform of the sync-pulse-added portion of the black signal are different from each other. This difference is caused by a nonlinear emphasis characteristic of the sub emphasis circuit 7. A greater-level signal is subjected to stronger emphasis by the sub emphasis circuit 7.

As shown in FIG. 2, a separated sync pulse generated by comparing the white signal with the slice level has a relatively small width and a retarded start timing. As shown in FIG. 3, a separated sync pulse generated by comparing the black signal with the slice level has a relatively great width and an advanced start timing.

Accordingly, during the S-VHS mode of operation, pulses of the sync signal separated by the sync separation circuit 4 tend to have different widths and different start timings. Thus, the separated sync signal tends to be unreliable.

Embodiment of the Invention

A signal processing circuit according to an embodiment of this invention improves over the background-art signal processing circuit in FIG. 1. Generally, the signal processing circuit of the embodiment of this invention is used in the recording side of a magnetic recording and reproducing apparatus capable of operating in any one of a VHS mode and an S-VHS mode. The magnetic recording and reproducing apparatus will be shortened to the apparatus hereinafter. During the VHS mode of operation of the apparatus, the recording side thereof processes an input video signal into a video signal of a VHS format. During the S-VHS mode of operation of the apparatus, the recording side thereof processes an input video signal into a video signal of an S-VHS format. The video signal of the S-VHS format is wider in frequency band and higher in picture quality than the video signal of the VHS format.

Figure 4:
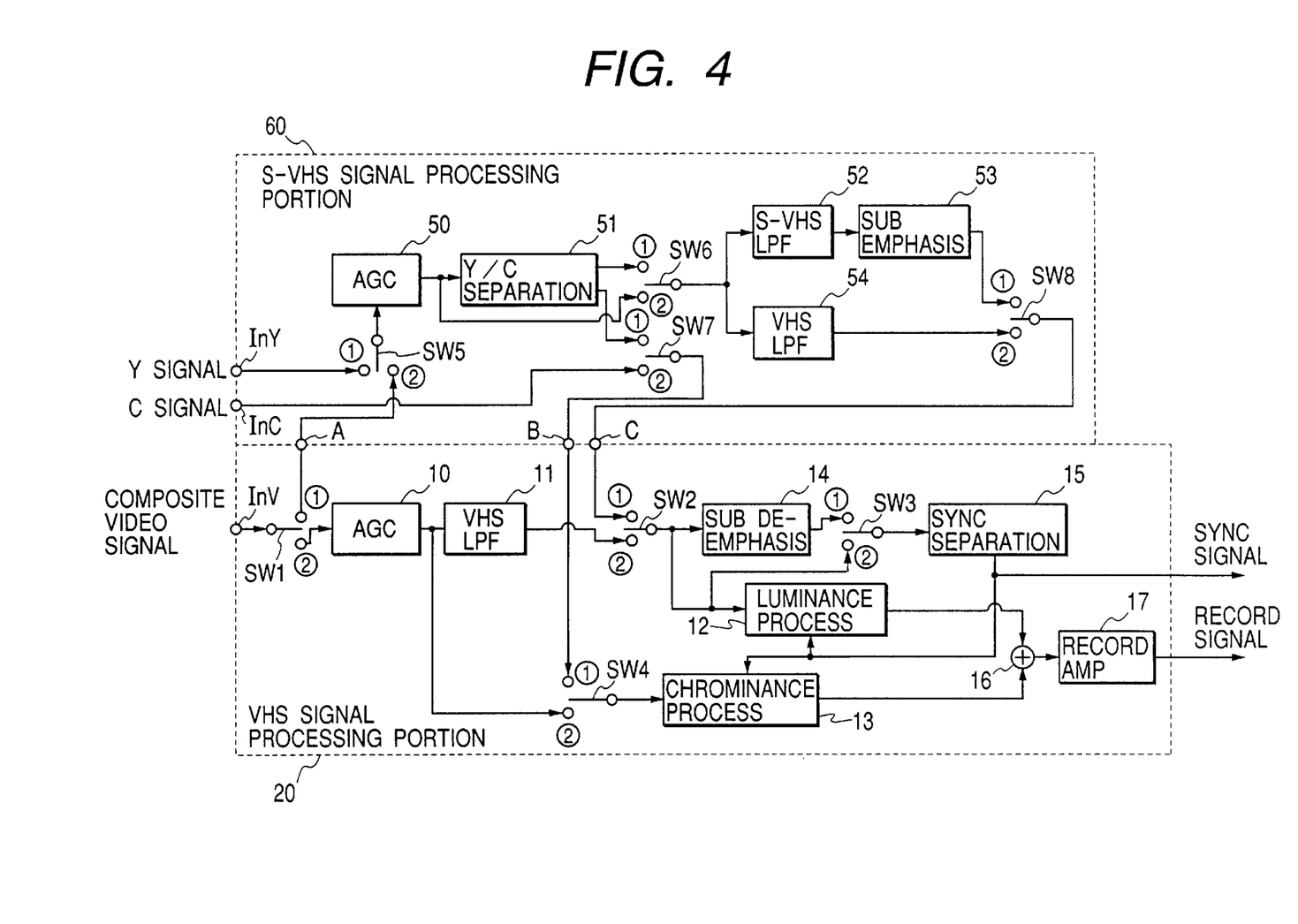
FIG. 4 is a block diagram of a signal processing circuit according to an embodiment of this invention.

FIG. 4 shows the signal processing circuit of the embodiment of this invention. As shown in FIG. 4, the signal processing circuit includes a VHS signal processing portion 20. An S-VHS signal processing portion 60 can be connected to the VHS signal processing portion 20. It is preferable to provide the VHS signal processing portion 20 and the S-VHS signal processing portion 60 on separate printed circuit boards, respectively.

The S-VHS signal processing portion 60 may be omitted from the recording side of the apparatus. In the absence of the S-VHS signal processing portion 60, the recording side of the apparatus is able to implement the processing of a VHS video signal only. On the other hand, in the presence of the S-VHS signal processing portion 60, the recording side of the apparatus is able to implement the processing of a VHS video signal and also the processing of an S-VHS video signal.

As shown in FIG. 4, the VHS signal processing portion 20 includes switches SW1, SW2, SW3, and SW4 while the S-VHS signal processing portion 60 includes switches SW5, SW6, SW7, and SW8. Each of the switches SW1–SW8 has a movable contact, and first and second fixed contacts. Each of the switches SW1–SW8 can change between a first position (a position (①)) and a second position (a position ②). In each of the switches SW1–SW8, the first and second fixed contacts are assigned to the first switch position (the switch position (①)) and the second switch position (the switch position ②) respectively. When each of the switches SW1–SW8 assumes its first position, the movable contact thereof is connected to the first fixed contact thereof and is disconnected from the second fixed contact thereof. When each of the switches SW1–SW8 assumes its second position, the movable contact thereof is connected to the second fixed contact thereof and is disconnected from the first fixed contact thereof.

With reference to FIG. 4, the VHS signal processing portion 20 includes the switch SW1 and an AGC circuit 10. The switch SW1 is connected among an input terminal InV, the AGC circuit 10, and a connection point "A". The connection point "A" is provided between the VHS signal processing portion 20 and the S-VHS signal processing portion 60. A composite video signal is applied to the switch SW1 via the input terminal InV. The switch SW1 transmits the composite video signal to either the AGC circuit 10 or the connection point "A".

The AGC circuit 10 automatically adjusts the level of the composite video signal at a suitable level. In the VHS signal processing portion 20, the AGC circuit 10 is followed by a low pass filter (LPF) 11 and the switch SW4. The AGC circuit 10 outputs the level-adjustment-resultant video signal to the low pass filter 11 and the switch SW4. The low pass filter 11 extracts a luminance signal from the output signal of the AGC circuit 10. The cutoff frequency of the low pass filter 11 is set to 3 MHz (3 MHz or lower in passband) or lower.

The VHS signal processing portion 20 includes the switches SW2 and SW3, a luminance signal processing circuit 12, a chrominance signal processing circuit 13, a sub de-emphasis circuit 14, a sync separation circuit 15, an adder 16, and a recording amplifier 17.

In the VHS signal processing portion 20, the switch SW2 is connected among the low pass filter 11, a connection point "C", the luminance signal processing circuit 12, the sub de-emphasis circuit 14, and the switch SW3. The connection point "C" is provided between the VHS signal processing portion 20 and the S-VHS signal processing portion 60. The low pass filter 11 outputs the luminance signal to the switch SW2. A luminance signal can be transmitted from the S-VHS signal processing portion 60 to the switch SW2 via the connection point "C". The switch SW2 selects one of the luminance signal from the low pass filter 11 and the luminance signal from the S-VHS signal processing portion 60, and transmits the selected luminance signal to the luminance signal processing circuit 12, the sub de-emphasis circuit 14, and the switch SW3.

The sub de-emphasis circuit 14 is connected to the switch SW3. The sub de-emphasis circuit 14 subjects the luminance signal to a sub de-emphasis process including a nonlinear de-emphasis process. The sub de-emphasis circuit 14 outputs the resultant luminance signal to the switch SW3.

In the VHS signal processing portion 20, the switch SW3 is connected among the switch SW2, the sub de-emphasis circuit 14, and the sync separation circuit 15. The switch SW3 selects one of the luminance signal from the switch SW2 and the luminance signal from the sub de-emphasis circuit 14, and transmits the selected luminance signal to the sync separation circuit 15. The sync separation circuit 15 separates a sync signal from the luminance signal fed via the switch SW3. The sync separation circuit 15 is connected to the luminance signal processing circuit 12 and the chrominance signal processing circuit 13. Also, the sync separation circuit 15 is connected to an output terminal for a sync signal. The sync separation circuit 15 outputs the separated sync signal to the luminance signal processing circuit 12 and the chrominance signal processing circuit 13. The separated sync signal can be transmitted from the sync separation circuit 15 to an external device.

The luminance signal processing circuit 12 subjects the luminance signal from the switch SW2 to various processes responsive to the sync signal fed from the sync separation circuit 15. The processes by the luminance signal processing circuit 12 include a noise reduction process, a main emphasis process, a white/dark clipping process, and a frequency modulation process. The luminance signal processing circuit 12 outputs the resultant luminance signal (the FM modulated luminance signal).

In the VHS signal processing portion 20, the switch SW4 is connected among the AGC circuit 10, a connection point "B", and the chrominance signal processing circuit 13. The connection point "B" is provided between the VHS signal processing portion 20 and the S-VHS signal processing portion 60. A color signal can be transmitted from the S-VHS signal processing portion 60 to the switch SW4 via the connection point "B". The switch SW4 selects one of the video signal from the AGC circuit 10 and the color signal from the S-VHS signal processing portion 60, and transmits the selected signal to the chrominance signal processing circuit 13. The chrominance signal processing circuit 13 processes the received signal in response to the sync signal fed from the sync separation circuit 15. Specifically, the chrominance signal processing circuit 13 extracts components from the received signal which have frequencies in a given band assigned to chrominance. In other words, the chrominance signal processing circuit 13 extracts chrominance components from the received signal. The chrominance signal processing circuit 13 implements frequency down conversion of the chrominance components, and thereby generates frequency-down-converted chrominance signals. The chrominance signal processing circuit 13 outputs the frequency-down-converted chrominance signals.

The adder 16 follows the luminance signal processing circuit 12 and the chrominance signal processing circuit 13. The adder 16 receives the FM modulated luminance signal from the luminance signal processing circuit 12. The adder 16 receives the frequency-down-converted chrominance signals from the chrominance signal processing circuit 13. The adder 16 multiplexes or combines the FM modulated luminance signal and the frequency-down-converted chrominance signals into a composite video signal on a frequency division basis. The adder 16 outputs the composite video signal to a recording current equalizer (not shown). The recording current equalizer processes the output signal of the adder 16 to compensate for variations in frequency response characteristics of parts including magnetic heads. The recording current equalizer outputs the resultant video signal to the recording amplifier 17. The recording amplifier 17 enlarges the output signal of the recording current equalizer to a level suited to signal recording on a magnetic tape. The recording amplifier 17 outputs the resultant video signal. The output signal of the recording amplifier 17 is transmitted via rotary transformers to magnetic heads before being recorded on the magnetic tape by the magnetic heads.

In the absence of the S-VHS signal processing portion 60, the switch SW1 is fixed to a position ② at which the AGC circuit 10 is connected to the input terminal InV, and the switch SW2 is fixed to a position ② at which the luminance signal processing circuit 12 and the switch SW3 are connected to the low pass filter 11. In addition, the switch SW3 is fixed to a position ② at which the sync separation circuit 15 is connected to the switch SW2, that is, connected to the low pass filter 11. Furthermore, the switch SW4 is fixed to a position ② at which the chrominance signal processing circuit 13 is connected to the AGC circuit 10.

In the absence of the S-VHS signal processing portion 60, the composite video signal fed via the input terminal InV is processed by the AGC circuit 10. The output signal of the AGC circuit 10 is processed into the luminance signal by the low pass filter 11. The luminance signal is transmitted from the low pass filter 11 to the luminance signal processing circuit 12 and the sync separation circuit 15 via the switches SW2 and SW3. The sync separation circuit 15 separates a sync signal from the luminance signal. In this case, since the luminance signal inputted into the sync separation circuit 15 differs from one which have been subjected to a nonlinear emphasis process (a sub emphasis process), the sync signal separated by the sync separation circuit 15 is correct and reliable. The sync separation circuit 15 outputs the separated sync signal to the luminance signal processing circuit 12 and the chrominance signal processing circuit 13. The sync separation circuit 15 can also output the separated sync signal to an external device. The luminance signal processing circuit 12 processes the luminance signal into an FM modulated luminance signal in response to the sync signal fed from the sync separation circuit 15. The luminance signal processing circuit 12 outputs the FM modulated luminance signal to the adder 16. On the other hand, the output signal of the AGC circuit 110 is processed into frequency-down-converted chrominance signals by the chrominance signal processing circuit 13 in response to the sync signal fed from the sync separation circuit 15. The chrominance signal processing circuit 13 outputs the frequency-down-converted chrominance signals to the adder 16. The adder 16 combines the FM modulated luminance signal and the frequency-down-converted chrominance signals into a composite video signal. The composite video signal is transmitted from the adder 16 to an external device via the recording amplifier 17 as a record signal (a signal to be recorded).

The combination of the VHS signal processing portion 20 and the S-VHS signal processing portion 60 is able to implement the processing of an S-VHS video signal in addition to the processing of a VHS video signal.

As shown in FIG. 4, the S-VHS signal processing portion 60 includes the switches SW5, SW6, SW7, and SW8, an AGC circuit 50, a Y/C separation circuit 51, a low pass filter (LPF) 52, a sub emphasis circuit 53, and a low pass filter (LPF) 54.

The switch SW5 is connected among an input terminal InY, the connection point "A", and the AGC circuit 50. A luminance signal is applied to the switch SW5 via the input terminal InY. A composite video signal can be transmitted from the VHS signal processing portion 20 to the switch SW5 via the connection point "A". The switch SW5 selects one of the luminance signal from the input terminal InY and the composite video signal from the VHS signal processing portion 20, and transmits the selected signal to the AGC circuit 50.

The AGC circuit 50 automatically adjusts the level of the signal from the switch SW5 at a suitable level. In the S-VHS signal processing portion 60, the AGC circuit 50 is followed by the Y/C separation circuit 51 and the switch SW6. The AGC circuit 50 outputs the level-adjustment-resultant video signal to the Y/C separation circuit 51 and the switch SW6. The Y/C separation circuit 51 divides the output signal of the AGC circuit 50 into a luminance signal and a color signal.

In the S-VHS signal processing portion 60, the switch SW6 is connected among the AGC circuit 50, the Y/C separation circuit 51, and the low pass filters 52 and 54. The Y/C separation circuit 51 outputs the luminance signal to the switch SW6. On the other hand, the luminance signal fed via the input terminal InY is transmitted to the switch SW6 via the switch SW5 and the AGC circuit 50. The switch SW6 selects one of the luminance signal from the Y/C separation circuit 51 and the luminance signal from the AGC circuit 50, and transmits the selected luminance signal to the low pass filters 52 and 54.

The low pass filter 52 processes the received luminance signal with a cutoff frequency of 5 MHz (5 MHz or lower in passband) or lower which matches with an S-VHS video signal. The low pass filter 52 is followed by the sub emphasis circuit 53. The low pass filter 52 outputs the processing-resultant luminance signal to the sub emphasis circuit 53. The sub emphasis circuit 53 subjects the luminance signal to a sub emphasis process including a nonlinear emphasis process. Specifically, the sub emphasis circuit 53 emphasizes high-frequency components of the luminance signal to enhance the luminance S/N. The sub emphasis circuit 53 outputs the resultant luminance signal.

The sub emphasis process by the sub emphasis circuit 53 in the S-VHS signal processing portion 60 and the sub de-emphasis process by the sub de-emphasis circuit 14 in the VHS signal processing portion 20 are inverse with respect to each other.

In the S-VHS signal processing portion 60, the low pass filter 54 processes the received luminance signal with a cutoff frequency of 4 MHz or lower which matches with a VHS video signal. The low pass filter 54 outputs the processing-resultant luminance signal.

The switch SW8 is connected among the sub emphasis circuit 53, the low pass filter 54, and the connection point "C". The switch SW8 receives the luminance signal from the sub emphasis circuit 53. The switch SW8 receives the luminance signal from the low pass filter 54. The switch SW8 selects one of the luminance signal from the sub emphasis circuit 53 and the luminance signal from the low pass filter 54, and transmits the selected luminance signal to the VHS signal processing portion 20 via the connection point "C".

The switch SW7 is connected among an input terminal InC, the Y/C separation circuit 51, and the connection point "B". A color signal is applied to the switch SW7 via the input terminal InC. The Y/C separation circuit 51 outputs the color signal to the switch SW7. The switch SW7 selects one of the color signal from the input terminal InC and the color signal from the Y/C separation circuit 51, and transmits the selected color signal to the VHS signal processing portion 20 via the connection terminal "B".

In the presence of the S-VHS signal processing portion 60, the composite video signal is transmitted from the switch SW1 in the VHS signal processing portion 20 to the switch SW5 in the S-VHS signal processing portion 60 via the connection point "A". In addition, the luminance signal is transmitted from the switch SW8 in the S-VHS signal processing portion 60 to the switch SW2 in the VHS signal processing portion 20 via the connection point "C". Furthermore, the color signal is transmitted from the switch SW7 in the S-VHS signal processing portion 60 to the switch SW4 in the VHS signal processing portion 20 via the connection point "B".

In the presence of the S-VHS signal processing portion 60, the recording side of the apparatus is able to implement the processing of a VHS video signal and also the processing of an S-VHS video signal. The recording side of the apparatus can handle the composite video signal fed via the input terminal InV, and also the component video signals, that is, the luminance signal and the color signal fed via the input terminals InY and InC.

Figure 5:
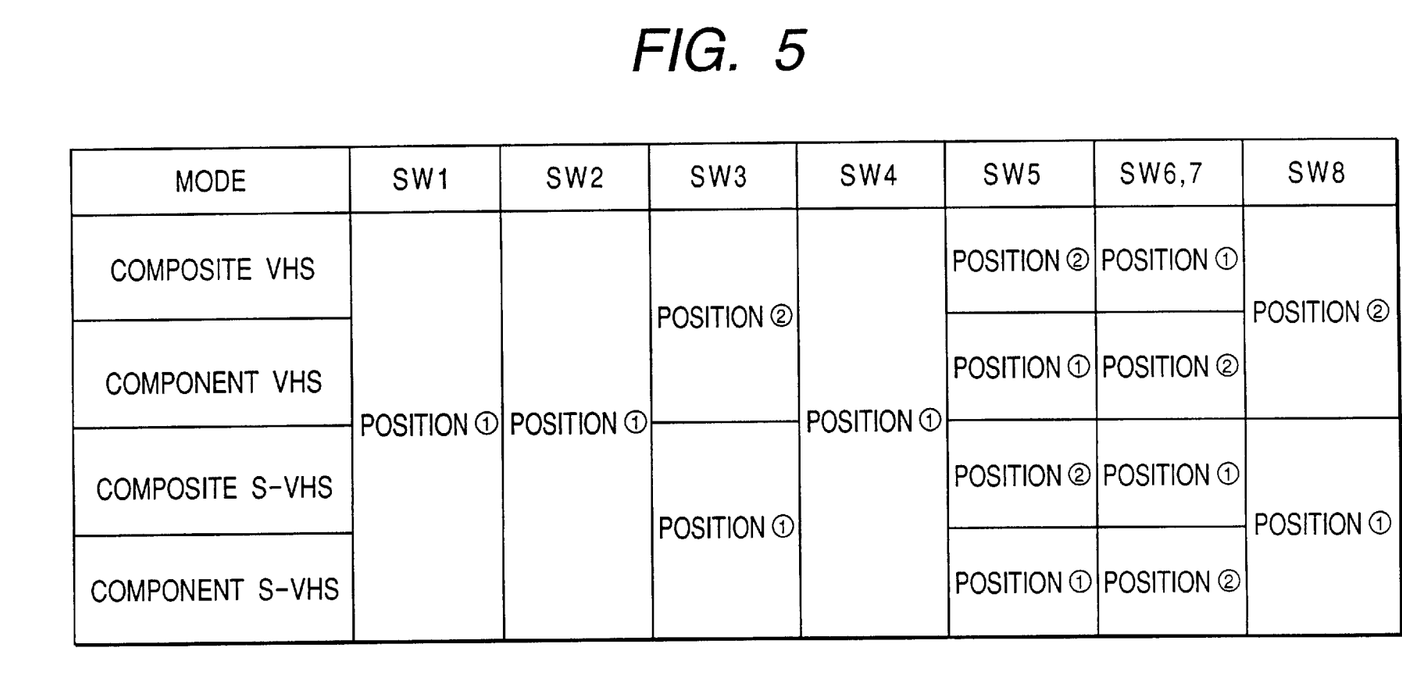
FIG. 5 is a diagram of the relation among the mode of operation of the recording side of a magnetic recording and reproducing apparatus and the positions of switches in FIG. 4.

In the presence of the S-VHS signal processing portion 60, the recording side of the apparatus operates in a mode which can be changed among a composite VHS mode, a component VHS mode, a composite S-VHS mode, and a component S-VHS mode. As shown in FIG. 5, the positions of the switches SW1–SW8 in the VHS signal processing portion 20 and the S-VHS signal processing portion 60 depend on the mode of operation of the recording side of the apparatus.

During the composite VHS mode of operation, the switch SW1 in the VHS signal processing portion 20 is fixed to a position ① at which a VHS composite video signal is transmitted from the input terminal InV to the switch SW5 in the S-VHS signal processing portion 60 via the connection point "A". The switch SW2 in the VHS signal processing portion 20 is fixed to a position ① at which the luminance signal is transmitted from the switch SW8 in the S-VHS signal processing portion 60 to the luminance signal processing circuit 12 and the switch SW3 in the VHS signal processing portion 20 via the connection point "C". The switch SW3 in the VHS signal processing portion 20 is fixed to a position ① at which the sync separation circuit 15 is connected to the switch SW2, that is, connected to the switch SW8 in the S-VHS signal processing portion 60. The switch SW4 in the VHS signal processing portion 20 is fixed to a position ③ at which the color signal is transmitted from the switch SW7 in the S-VHS signal processing portion 60 to the chrominance signal processing circuit 13 in the VHS signal processing portion 20 via the connection point "B". The switch SW5 in the S-VHS signal processing portion 60 is fixed to a position ② at which the composite video signal is transmitted from the switch SW1 in the VHS signal processing portion 20 to the AGC circuit 50 in the S-VHS signal processing portion 60. The switch SW6 in the S-VHS signal processing portion 60 is fixed to a position ① at which the low pass filters 52 and 54 are connected to the Y/C separation circuit 51. The switch SW7 in the S-VHS signal processing portion 60 is fixed to a position ① at which the color signal is transmitted from the Y/C separation circuit 51 in the S-VHS signal processing portion 60 to the switch SW4 in the VHS signal processing portion 20 via the connection point "B". The switch SW8 in the S-VHS signal processing portion 60 is fixed to a position ② at which the luminance signal is transmitted from the low pass filter 54 to the switch SW2 in the VHS signal processing portion 20 via the connection point "C".

During the composite VHS mode of operation, a VHS composite video signal fed via the input terminal InV is transmitted to the AGC circuit 50 via the switches SW1 and SW5. The composite video signal is successively processed by the AGC circuit 50 and the Y/C separation circuit 51. The composite video signal is divided into a luminance signal and a color signal by the Y/C separation circuit 51. The luminance signal is transmitted from the Y/C separation circuit 51 to the low pass filter 54 via the switch SW6. The luminance signal is processed by the low pass filter 54. The processing-resultant luminance signal is transmitted from the low pass filter 54 to the luminance signal processing circuit 12 and the switch SW3 via the switches SW8 and SW2. Then, the luminance signal is transmitted via the switch SW3 to the sync separation circuit 15. The sync separation circuit 15 separates a sync signal from the luminance signal. In this case, since the luminance signal inputted into the sync separation circuit 15 differs from the output signal of the sub emphasis circuit 53, the sync signal separated by the sync separation circuit 15 is correct and reliable. The sync separation circuit 15 outputs the separated sync signal to the luminance signal processing circuit 12 and the chrominance signal processing circuit 13. The sync separation circuit 15 can also output the separated sync signal to an external device. The luminance signal processing circuit 12 processes the luminance signal into an FM modulated luminance signal in response to the sync signal fed from the sync separation circuit 15. On the other hand, the color signal is transmitted from the Y/C separation circuit 51 to the chrominance signal processing circuit 13 via the switches SW7 and SW4. The color signal is processed into frequency-down-converted chrominance signals by the chrominance signal processing circuit 13 in response to the sync signal fed from the sync separation circuit 15.

During the component VHS mode of operation, the switch SW1 in the VHS signal processing portion 20 is fixed to the position ① at which the connection point "A" is connected to the input terminal InV. The switch SW2 in the VHS signal processing portion 20 is fixed to the position ① at which the luminance signal is transmitted from the switch SW8 in the S-VHS signal processing portion 60 to the luminance signal processing circuit 12 and the switch SW3 in the VHS signal processing portion 20 via the connection point "C". The switch SW3 in the VHS signal processing portion 20 is fixed to the position ② at which the sync separation circuit 15 is connected to the switch SW2, that is, connected to the switch SW8 in the S-VHS signal processing portion 60. The switch SW4 in the VHS signal processing portion 20 is fixed to the position ① at which the color signal is transmitted from the switch SW7 in the S-VHS signal processing portion 60 to the chrominance signal processing circuit 13 in the VHS signal processing portion 20 via the connection point "B". The switch SW5 in the S-VHS signal processing portion 60 is fixed to a position ① at which a VHS luminance signal is transmitted from the input terminal InY to the AGC circuit 50 in the S-VHS signal processing portion 60. The switch SW6 in the S-VHS signal processing portion 60 is fixed to a position ② at which the low pass filters 52 and 54 are connected to the AGC circuit 50 in the S-VHS signal processing portion 60. The switch SW7 in the S-VHS signal processing portion 60 is fixed to a position ② at which a VHS color signal is transmitted from the input terminal InC to the switch SW4 in the VHS signal processing portion 20 via the connection point "B". The switch SW8 in the S-VHS signal processing portion 60 is fixed to the position ② at which the luminance signal is transmitted from the low pass filter 54 to the switch SW2 in the VHS signal processing portion 20 via the connection point "C".

During the component VHS mode of operation, a VHS luminance signal fed via the input terminal InY is transmitted to the AGC circuit 50 via the switch SW5. The luminance signal is processed by the AGC circuit 50. The resultant luminance signal is transmitted from the AGC circuit 50 to the low pass filter 54 via the switch SW6. The luminance signal is processed by the low pass filter 54. The processing-resultant luminance signal is transmitted from the low pass filter 54 to the luminance signal processing circuit 12 and the switch SW3 via the switches SW8 and SW2. Then, the luminance signal is transmitted via the switch SW3 to the sync separation circuit 15. The sync separation circuit 15 separates a sync signal from the luminance signal. In this case, since the luminance signal inputted into the sync separation circuit 15 differs from the output signal of the sub emphasis circuit 53, the sync signal separated by the sync separation circuit 15 is correct and reliable. The sync separation circuit 15 outputs the separated sync signal to the luminance signal processing circuit 12 and the chrominance signal processing circuit 13. The sync separation circuit 15 can also output the separated sync signal to an external device. The luminance signal processing circuit 12 processes the luminance signal into an FM modulated luminance signal in response to the sync signal fed from the sync separation circuit 15. On the other hand, a VHS color signal fed via the input terminal InC is transmitted to the chrominance signal processing circuit 13 via the switches SW7 and SW4. The color signal is processed into frequency-down-converted chrominance signals by the chrominance signal processing circuit 13 in response to the sync signal fed from the sync separation circuit 15.

During the composite S-VHS mode of operation, the switch SW1 in the VHS signal processing portion 20 is fixed to the position ① at which an S-VHS composite video signal is transmitted from the input terminal InV to the switch SW5 in the S-VHS signal processing portion 60 via the connection point "A". The switch SW2 in the VHS signal processing portion 20 is fixed to the position ① at which the luminance signal is transmitted from the switch SW8 in the S-VHS signal processing portion 60 to the luminance signal processing circuit 12 and the sub de-emphasis circuit 14 in the VHS signal processing portion 20 via the connection point "C". The switch SW3 in the VHS signal processing portion 20 is fixed to a position ① at which the sync separation circuit 15 is connected to the sub de-emphasis circuit 14. The switch SW4 in the VHS signal processing portion 20 is fixed to the position ① at which the color signal is transmitted from the switch SW7 in the S-VHS signal processing portion 60 to the chrominance signal processing circuit 13 in the VHS signal processing portion 20 via the connection point "B". The switch SW5 in the S-VHS signal processing portion 60 is fixed to the position ② at which the composite video signal is transmitted from the switch SW1 in the VHS signal processing portion 20 to the AGC circuit 50 in the S-VHS signal processing portion 60. The switch SW6 in the S-VHS signal processing portion 60 is fixed to the position ① at which the low pass filters 52 and 54 are connected to the Y/C separation circuit 51. The switch SW7 in the S-VHS signal processing portion 60 is fixed to the position ① at which the color signal is transmitted from the Y/C separation circuit 51 in the S-VHS signal processing portion 60 to the switch SW4 in the VHS signal processing portion 20 via the connection point "B". The switch SW8 in the S-VHS signal processing portion 60 is fixed to a position ① at which the luminance signal is transmitted from the sub emphasis circuit 53 to the switch SW2 in the VHS signal processing portion 20 via the connection point "C".

During the composite S-VHS mode of operation, an S-VHS composite video signal fed via the input terminal InV is transmitted to the AGC circuit 50 via the switches SW1 and SW5. The composite video signal is successively processed by the AGC circuit 50 and the Y/C separation circuit 51. The composite video signal is divided into a luminance signal and a color signal by the Y/C separation circuit 51. The luminance signal is transmitted from the Y/C separation circuit 51 to the low pass filter 52 via the switch SW6. The luminance signal is successively processed by the low pass filter 52 and the sub emphasis circuit 53. Specifically, the sub emphasis circuit 53 subjects the output signal of the low pass filter 52 to the sub emphasis process. The processing-resultant luminance signal is transmitted from the sub emphasis circuit 53 to the luminance signal processing circuit 12 and the sub de-emphasis circuit 14 via the switches SW8 and SW2. The sub de-emphasis circuit 14 subjects the luminance signal to a sub de-emphasis process inverse with respect to the sub emphasis process by the sub emphasis circuit 53. Accordingly, the sub de-emphasis circuit 14 cancels the sub emphasis process by the sub emphasis circuit 53. The sub de-emphasis circuit 14 outputs the resultant luminance signal to the switch SW3. The output signal of the sub de-emphasis circuit 14 is equivalent to the output signal of the low pass filter 52. The luminance signal is transmitted via the switch SW3 to the sync separation circuit 15. The sync separation circuit 15 separates a sync signal from the luminance signal. In this case, since the sub emphasis process by the sub emphasis circuit 53 is canceled by the sub de-emphasis circuit 14 regarding the luminance signal, the sync signal separated by the sync separation circuit 15 is correct and reliable. The sync separation circuit 15 outputs the separated sync signal to the luminance signal processing circuit 12 and the chrominance signal processing circuit 13. The sync separation circuit 15 can also output the separated sync signal to an external device. The luminance signal processing circuit 12 processes the luminance signal into an FM modulated luminance signal in response to the sync signal fed from the sync separation circuit 15. On the other hand, the color signal is transmitted from the Y/C separation circuit 51 to the chrominance signal processing circuit 13 via the switches SW7 and the SW4. The color signal is processed into frequency-down-converted chrominance signals by the chrominance signal processing circuit 13 in response to the sync signal fed from the sync separation circuit 15.

During the component S-VHS mode of operation, the switch SW1 in the VHS signal processing portion 20 is fixed to the position ① at which the connection point "A" is connected to the input terminal InV. The switch SW2 in the VHS signal processing portion 20 is fixed to the position ① at which the luminance signal is transmitted from the switch SW8 in the S-VHS signal processing portion 60 to the luminance signal processing circuit 12 and the sub de-emphasis circuit 14 in the VHS signal processing portion 20 via the connection point "C". The switch SW3 in the VHS signal processing portion 20 is fixed to the position ① at which the sync separation circuit 15 is connected to the sub de-emphasis circuit 14. The switch SW4 in the VHS signal processing portion 20 is fixed to the position ① at which the color signal is transmitted from the switch SW7 in the S-VHS signal processing portion 60 to the chrominance signal processing circuit 13 in the VHS signal processing portion 20 via the connection point "B". The switch SW5 in the S-VHS signal processing portion 60 is fixed to the position ① at which an S-VHS luminance signal is transmitted from the input terminal InY to the AGC circuit 50 in the S-VHS signal processing portion 60. The switch SW6 in the S-VHS signal processing portion 60 is fixed to the position ② at which the low pass filters 52 and 54 are connected to the AGC circuit 50 in the S-VHS signal processing portion 60. The switch SW7 in the S-VHS signal processing portion 60 is fixed to the position ② at which an S-VHS color signal is transmitted from the input terminal InC to the switch SW4 in the VHS signal processing portion 20 via the connection point "B". The switch SW8 in the S-VHS signal processing portion 60 is fixed to the position ① at which the luminance signal is transmitted from the sub emphasis circuit 53 to the switch SW2 in the VHS signal processing portion 20 via the connection point "C".

During the component S-VHS mode of operation, an S-VHS luminance signal fed via the input terminal InY is transmitted to the AGC circuit 50 via the switch SW5. The luminance signal is processed by the AGC circuit 50. The resultant luminance signal is transmitted from the AGC circuit 50 to the low pass filter 52 via the switch SW6. The luminance signal is successively processed by the low pass filter 52 and the sub emphasis circuit 53. Specifically, the sub emphasis circuit 53 subjects the output signal of the low pass filter 52 to the sub emphasis process. The processing-resultant luminance signal is transmitted from the sub emphasis circuit 53 to the luminance signal processing circuit 12 and the sub de-emphasis circuit 14 via the switches SW8 and SW2. The sub de-emphasis circuit 14 subjects the luminance signal to the sub de-emphasis process inverse with respect to the sub emphasis process by the sub emphasis circuit 53. Accordingly, the sub de-emphasis circuit 14 cancels the sub emphasis process by the sub emphasis circuit 53. The sub de-emphasis circuit 14 outputs the resultant luminance signal to the switch SW3. The output signal of the sub de-emphasis circuit 14 is equivalent to the output signal of the low pass filter 52. The luminance signal is transmitted via the switch SW3 to the sync separation circuit 15. The sync separation circuit 15 separates a sync signal from the luminance signal. In this case, since the sub emphasis process by the sub emphasis circuit 53 is canceled by the sub de-emphasis circuit 14 regarding the luminance signal, the sync signal separated by the sync separation circuit 15 is correct and reliable. The sync separation circuit 15 outputs the separated sync signal to the luminance signal processing circuit 12 and the chrominance signal processing circuit 13. The sync separation circuit 15 can also output the separated sync signal to an external device. The luminance signal processing circuit 12 processes the luminance signal into an FM modulated luminance signal in response to the sync signal fed from the sync separation circuit 15. On the other hand, an S-VHS color signal fed via the input terminal InC is transmitted to the chrominance signal processing circuit 13 via the switches SW7 and SW4. The color signal is processed into frequency-down-converted chrominance signals by the chrominance signal processing circuit 13 in response to the sync signal fed from the sync separation circuit 15.

During the composite VHS mode of operation, the component VHS mode of operation, the composite S-VHS mode of operation, and the component S-VHS mode of operation, the luminance signal processing circuit 12 outputs the FM modulated luminance signal to the adder 16. On the other hand, the chrominance signal processing circuit 13 outputs the frequency-down-converted chrominance signals to the adder 16. The adder 16 multiplexes or combines the FM modulated luminance signal and the frequency-down-converted chrominance signals into a composite video signal on a frequency division basis. The adder 16 outputs the composite video signal to the recording current equalizer (not shown). The recording current equalizer processes the output signal of the adder 16, and outputs the resultant video signal to the recording amplifier 17. The recording amplifier 17 enlarges the output signal of the recording current equalizer to the level suited to the signal recording on the magnetic tape. The recording amplifier 17 outputs the resultant video signal. The output signal of the recording amplifier 17 is transmitted via the rotary transformers to the magnetic heads before being recorded on the magnetic tape by the magnetic heads.

Preferably, the passband width of the VHS low pass filter 54 in the S-VHS signal processing portion 60 is slightly greater than that of the low pass filter 11 in the VHS signal processing portion 20.

According to a first example, the switches SW1–SW8 are changed in response to control signals generated via manually-operated buttons or keys. According to a second example, a decoder (not shown) including a ROM generates control signals in response to information representing the mode of operation of the apparatus. In the second example, the switches SW1–SW8 are changed in response to the control signals generated by the decoder.

What is claimed is:

1. A signal processing circuit for use in a recording apparatus which operates in any one of a standard mode and a high-quality mode, the apparatus recording a video signal of a standard format during the standard mode of operation, the apparatus recording a video signal of a high-quality format during the high-quality mode of operation, wherein the video signal of the high-quality format is wider in frequency band than the video signal of the standard format, the circuit comprising:

first means for subjecting a first signal to a nonlinear emphasis process to convert the first signal into a second signal;

second means for selecting one of the first signal and the second signal in response to whether the apparatus operates in the standard mode or the high-quality mode, and for outputting the selected signal as a third signal;

third means for subjecting the third signal to a nonlinear de-emphasis process to convert the third signal into a fourth signal, the nonlinear de-emphasis process being inverse with respect to the nonlinear emphasis process;

fourth means for selecting one of the third signal and the fourth signal in response to whether the apparatus operates in the standard mode or the high-quality mode, and for outputting the selected signal as a fifth signal; and fifth means for separating a sync signal from the fifth signal;

wherein during the standard mode of operation of the apparatus, the first means selects the first signal, and the fourth means selects the third signal; and wherein during the high-quality mode of operation of the apparatus, the first means selects the second signal, and the fourth means selects the fourth signal.

2. A signal processing circuit comprising:

first means for subjecting a first video signal to a nonlinear emphasis process to convert the first video signal into a second video signal;

second means for selecting one of the first video signal and the second video signal, and for outputting the selected video signal as a third video signal;

third means for subjecting the third video signal to a nonlinear de-emphasis process to convert the third video signal into a fourth video signal, the nonlinear de-emphasis process being inverse with respect to the nonlinear emphasis process;

fourth means for selecting the third video signal when the second means selects the first video signal, for selecting the fourth video signal when the second means selects the second video signal, and for outputting the selected signal as a fifth video signal; and fifth means for separating a sync signal from the fifth video signal.

3. A video signal processing apparatus comprising:

a first video signal processing circuit; and a second video signal processing circuit connectable to the first video signal processing circuit;

wherein the first video signal processing circuit and the second video signal processing circuit comprise means for processing either a video signal of a standard format or a video signal of a high-quality format into a record signal in the presence of the second video signal processing circuit connected to the first video signal processing circuit, and the video signal of the high-quality format is higher in picture quality than the video signal of the standard format and is wider in frequency band than the video signal of the standard format;

wherein the first video signal processing circuit comprises means for processing a video signal of the standard format into a record signal in the absence of the second video signal processing circuit;

wherein the second video signal processing circuit comprises means for subjecting the video signal of the high-quality format to a nonlinear emphasis process to convert the video signal of the high-quality format into a first processing-resultant signal; and wherein the first video signal processing circuit comprises means for subjecting the first processing-resultant signal to a nonlinear de-emphasis process to convert the first processing-resultant signal into a second processing-resultant signal, and means for separating a sync signal from the second processing-resultant signal, the nonlinear de-emphasis process being inverse with respect to the nonlinear emphasis process.

* * * * *